(12) United States Patent
Chang

(10) Patent No.: US 6,773,143 B2
(45) Date of Patent: Aug. 10, 2004

(54) STRUCTURE FOR REFLECTION OF LIGHT

(75) Inventor: Sean Chang, Tao Yuan County (TW)

(73) Assignee: Delta Electronics, Inc., Taoyuan County (TW)

(*) Notice: Subject to any disclaimer, the term of this patent is extended or adjusted under 35 U.S.C. 154(b) by 0 days.

(21) Appl. No.: 10/301,147

(22) Filed: Nov. 20, 2002

(65) Prior Publication Data

US 2004/0062045 A1 Apr. 1, 2004

(30) Foreign Application Priority Data

Sep. 27, 2002 (TW) .................................... 91122451 A

(51) Int. Cl.$^7$ ................................................ F21V 7/00
(52) U.S. Cl. ................................... 362/346; 362/297
(58) Field of Search ................................ 362/296, 297, 362/298, 299, 346, 347

(56) References Cited

U.S. PATENT DOCUMENTS

| 4,517,631 A | * | 5/1985 | Mullins ........................ 362/346 |
| 4,956,759 A | * | 9/1990 | Goldenberg et al. ......... 362/297 |
| 5,971,571 A | * | 10/1999 | Rose ............................ 362/346 |
| 6,238,066 B1 | * | 5/2001 | Iwasaki ....................... 362/347 |
| 6,523,977 B2 | * | 2/2003 | Chuang et al. .............. 362/231 |

* cited by examiner

*Primary Examiner*—John Anthony Ward
(74) *Attorney, Agent, or Firm*—Pro-Techtor International Services

(57) ABSTRACT

A structure for reflection of light comprising a curved surface reflector for reflecting the light emitted from a light source located on a focus of the curved surface reflector, and a semi-sphere surface for reflecting the light emitted from the light source located on a center of the semi-sphere surface. In specific, the focus of the curved surface reflector and the center of the semi-sphere surface are so positioned as to be substantially on the same location, thus after the light emitted from the light source is reflected by the semi-sphere surface, the reflected light passes through the center to illuminate on the curved surface reflector, so that all of the light emitted from the light source can pass through the center to illuminate on the curved surface reflector and is then reflected by the same so as to obtain a condensed light beam with the smaller converging angle and spot size.

9 Claims, 3 Drawing Sheets

STRUCTURE FOR REFLECTION OF LIGHT

BACKGROUND OF THE INVENTION

1. Field of the Invention

The present invention relates to a structure for reflection of light, and more particularly, to a structure for obtaining a light beam with a smaller converging angle and spot size.

2. Description of the Related Art

Please refer to FIG. 1, a partially cross sectional view of a conventional structure 100 for reflection of light is illustrated.

As shown in FIG. 1, the structure 100 comprises a reflector 101 for reflecting light, wherein a focus of the reflector 101 is represented by a point 102. The reflector 101 is generally an ellipsoid or a paraboloid. It should be understood for person skilled in the art that the light emitted from light source 103 which is not a perfect point light source and is inherently formed with an arc gap and located on the point 102 can be reflected by the ellipsoid and thus condensed on the other focus 104 of the ellipsoid, wherein a converging angle and a diameter of a spot size are denoted by $\theta$ and $\Phi_d$, respectively.

When the above-mentioned structure 100 is applied to a digital projector, in order to improve the illumination efficiency of the digital projector, it is advantageous that the reflected light with the larger converging angles could be collected and then guided into the optical components of the projector. However, the optical thin film performance is related to the incidence angle of light. The larger the incidence angle of light is, the poorer the optical performance is. For example, when the reflected light with an undesired shifted optical spectrum is produced, then an inaccuracy in color of images illuminated by the reflected light or deterioration in contrast of the same images is disadvantageously occurred.

In view of the above, it is required a structure capable of reducing the converging angle of the reflected light and collecting all of the light emitted from the light source, so that it is possible to improve the corresponding illumination efficiency and simultaneously preserve the desired accuracy in color and contrast.

SUMMARY OF THE INVENTION

Thus, it is an object of the present invention to provide a structure for reflection of light capable of reducing the converging angle of the reflected light so as to improve the corresponding illumination efficiency and simultaneously preserve the desired accuracy in color and contrast.

It is another object of the present invention to provide a structure for collecting light capable of condensing the respective light emitted from two light sources on an area of a spot size and still retaining the converging angle as the same as that of the conventional structure so as to achieve an effect on more brightness and uniformity.

The structure for reflection of light is provided according to one embodiment of the present invention, which comprises a curved surface reflector for reflecting the light emitted from a light source located on a first focus of the curved surface reflector, and a semi-sphere surface reflector for reflecting the light emitted from the light source located on a center of the semi-sphere surface, wherein the first focus of the curved surface reflector and the center of the semi-sphere surface are so positioned as to be substantially on the same location. Thus, after the light emitted from the light source, half of the light beam will illuminate on the semi-sphere surface reflector and is reflected by the semi-sphere surface reflector. The reflected light will passes through the center of the semi-sphere surface again to illuminate on the curved surface reflector. The other half of light beam will illuminate on the curved surface reflector directly, so that all of the light reflected by the semi-sphere surface can pass through the center to illuminate on the curved surface reflector and is then reflected by the same.

It is preferred that the curved surface reflector is a semi-ellipsoid, so that the light reflected by the reflector is condensed at a second focus of the semi-ellipsoid.

It is preferred that the curved surface reflector is a semi-paraboloid. In this case, the structure further comprises a lens for condensing the light reflected by the reflector at a second focus.

A structure for collecting light is provided according to another embodiment of the present invention, which comprises a first curved surface reflector for reflecting the light emitted from a first light source located on a first focus of the first curved surface reflector, a second curved surface reflector for reflecting the light emitted from a second light source located on a first focus point of the second curved surface reflector, a first semi-sphere surface reflector for reflecting the light emitted from the first light source located on a center of the first semi-sphere surface, and a second semi-sphere surface reflector for reflecting the light emitted from the second light source located on a center of the second semi-sphere surface, wherein the first focus of the first curved surface reflector and the center of the first semi-sphere surfaces are so positioned as to be substantially on a first location, the first focus of the second curved surface reflector and the center of the second semi-sphere surfaces are so positioned as to be substantially on a second location, and after the light emitted from the first and second light sources is reflected by the first and second semi-sphere surfaces, respectively, the reflected light pass through the respective centers of the semi-sphere surfaces to illuminate on the first and second curved surface reflectors, respectively, so that all of the light reflected by the first and second semi-sphere surfaces can pass through the respective centers to illuminate on the respective curved surface reflector, be reflected by the same, then be condensed at a second focus.

It is preferred that a combination of the first curved surface reflector and the first semi-sphere surface reflector and another combination of the second curved surface reflector and the second semi-sphere surface reflector are arranged in an angular manner.

It is preferred that the curved surface reflector is a semi-ellipsoid, so that the light reflected by the structure is condensed at a second focus of the semi-ellipsoid.

It is preferred that the curved surface reflector is a semi-paraboloid. In this case, the structure further comprises a lens for condensing the light reflected by the structure at a second focus.

DETAILED DESCRIPTION OF THE PREFERRED EMBODIMENTS

Figure 2:
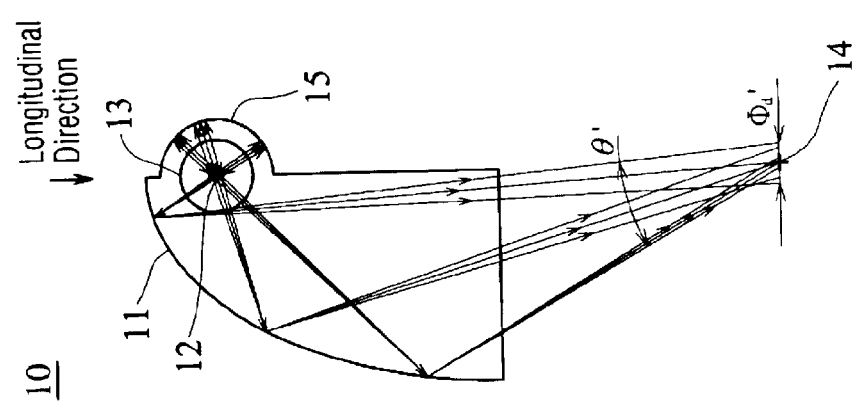
FIG. 2 is a partially cross sectional view of a structure for reflection of light according to the first embodiment of the present invention.
Figure 1:
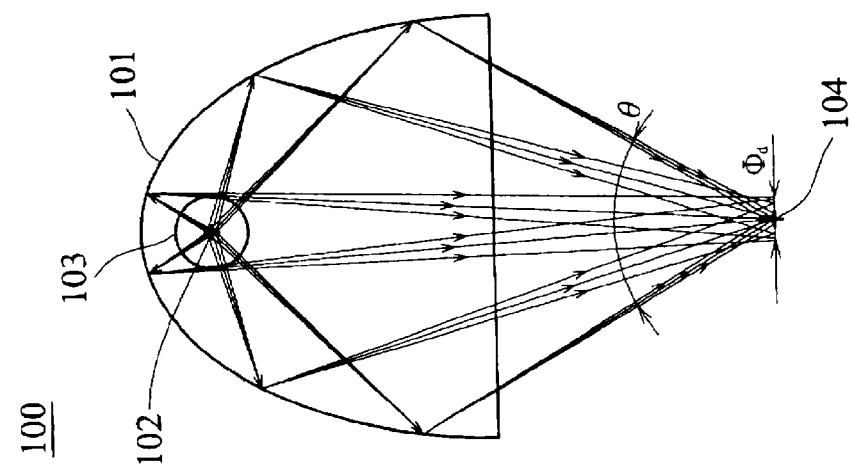
FIG. 1 is a partially cross sectional view of a conventional structure for reflection of light.

Please refer to FIG. 2, a partially cross sectional view of a structure 10 for reflection of light according to the first embodiment of the present invention is illustrated.

As shown in FIG. 2, the structure 10 includes a curved surface reflector 11 for reflecting light which has a first focus denoted by a point 12 and a semi-sphere surface reflector 15 for reflecting light, wherein a center of the semi-sphere surface 15 is positioned on the point 12, i.e. the first focus of the curved surface reflector 11 and the center of the semi-sphere surface 15 are so positioned as to be substantially on the same location. The curved surface reflector 11 is preferably a semi-ellipsoid or a semi-paraboloid. Taking the curved surface reflector 11 in FIG. 2 being the semi-ellipsoid as an example, when a light source 13 which is not a perfect point light source and is inherently formed with an arc gap and is positioned on the point 12 and lightened, then on the one hand, part of the light emitted from the light source 13 illuminate the semi-ellipsoid reflector and is reflected by the semi-ellipsoid reflector and condensed on a second focus 14, on the other hand, the rest of light emitted from the light source 13 illuminates the semi-sphere surface reflector 15 and is reflected by the semi-sphere surface reflector 15. Then, the reflected light passes through the center of the semi-sphere surface 15, i.e. the point 12, to illuminate on the semi-ellipsoid and thus condense on the second focus 14, so that all of the light reflected by the semi-sphere surface 15 can pass through the point 12 to illuminate on the semi-ellipsoid and is then reflected by the same, and is thus condensed. In the above-mentioned case, a converging angle and a diameter of a spot size are denoted by $\theta'$ and $\Phi_d'$, respectively.

According to the above, it should be understood that the diameter $\Phi_d'$ of the spot size is notwithstanding determined by the shape of the curved surface reflector 11, the converging angle $\theta'$ according to the present embodiment is reduced to a half of the converging angle $\theta$ of the conventional structure. It is possible to achieve the improved illumination efficiency and the desired illumination characteristics according to the structure 10 of the present embodiment capable of reducing the converging angle to one half.

Figure 3:
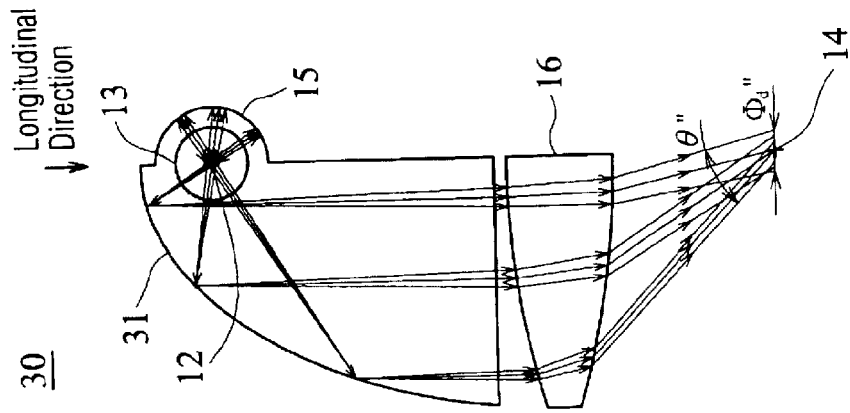
FIG. 3 is a partially cross sectional view of a structure for reflection of light according to the second embodiment of the present invention.

Please refer to FIG. 3 of a partially cross sectional view of a modified structure 30 according to the second embodiment of the present invention. It is similar to the structure 10 in FIG. 2 except for the curved surface reflector 31 being the semi-paraboloid. In specific, part of the light emitted from the light source 13 directly illuminates on the semi-paraboloid reflector, and the rest of light emitted from the light source 13 will illuminate the semi-sphere surface 15. The light illuminating the semi-sphere reflector 15 will be reflected and pass through the center of the semi-sphere reflector 15 and then illuminate the semi-paraboloid reflector. Eventually, all the light emitted from the light source 13 will illuminate the semi-paraboloid. Hence, as shown in FIG. 3, the light reflected by the semi-paraboloid is advanced along a longitudinal direction of the structure 30. In this case, an condensing lens 16 is preferably provided in the direction of advancement of the reflected light (a half of the lens 16 is merely shown in FIG. 3), so that the light passing through the condensing lens 16 is refracted by the same and condensed on a predetermined location, such as the location corresponding to that of the focus 14 in FIG. 2.

According to the modified structure 30 of the present embodiment, the converging angle $\theta''$ and the diameter $\Phi_d''$ of the spot size are not only allowed to be the same as those in FIG. 2, i.e. the converging angle $\theta'$ and the diameter $\Phi_d'$, the converging angle $\theta''$ is also reduced to a half of the conventional converging angle $\theta$. It is possible to achieve the improved illumination efficiency and the desired illumination characteristics according to the structure 30 of the present embodiment capable of reducing the converging angle to one half.

Figure 4:
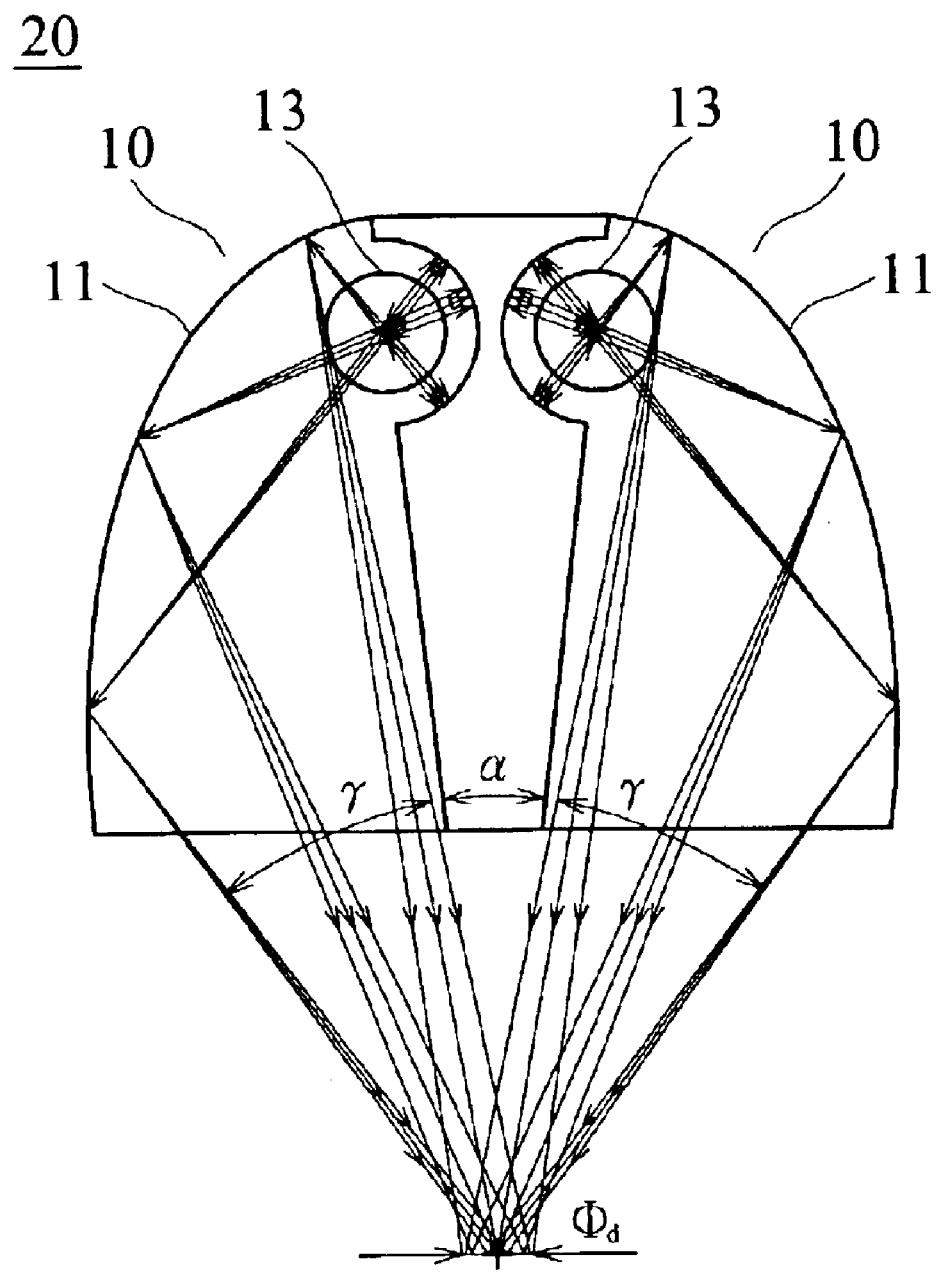
FIG. 4 is a partially cross sectional view of a structure for collecting light according to the third embodiment of the present invention.

Please refer to FIG. 4 of a partially cross sectional view of a structure 20 for collecting light according to the third embodiment of the present invention. As shown in FIG. 4, the structure 20 for collecting light includes two structures 10 of the first embodiment of the present invention. Substantially, the two structures 10 are arranged in an angular manner. Taking each curved surface reflector 11 of the structure 10 being the semi-ellipsoid and each converging angle being degrees $\gamma$ as an example, it is obvious that the converging angle $\gamma$ corresponds to the converging angle $\theta'$, i.e. the converging angle $\gamma$ is a half of the conventional converging angle $\theta$ according to the aforementioned illustration of FIG. 2.

In comparison with the convention structure 1, the converging angle of the structure 20 of the present embodiment becomes $2\gamma+\alpha(\approx\theta+\alpha)$ which is larger than the conventional converging angle $\theta$ by the value of $\alpha$. However, it should be understood that not only the angle $\alpha$ can be designed to be sufficiently small, but also both of the light emitted from the two light sources 13 can be condensed on a spot size of the same conventional diameter $\Phi_d$, so that the structure 20 of the present embodiment can achieve an effect on duplicating the optical density on the spot size $\Phi_d$ and still retaining the converging angle as the same as that of the conventional structure and improving brightness and uniformity.

Figure 5:
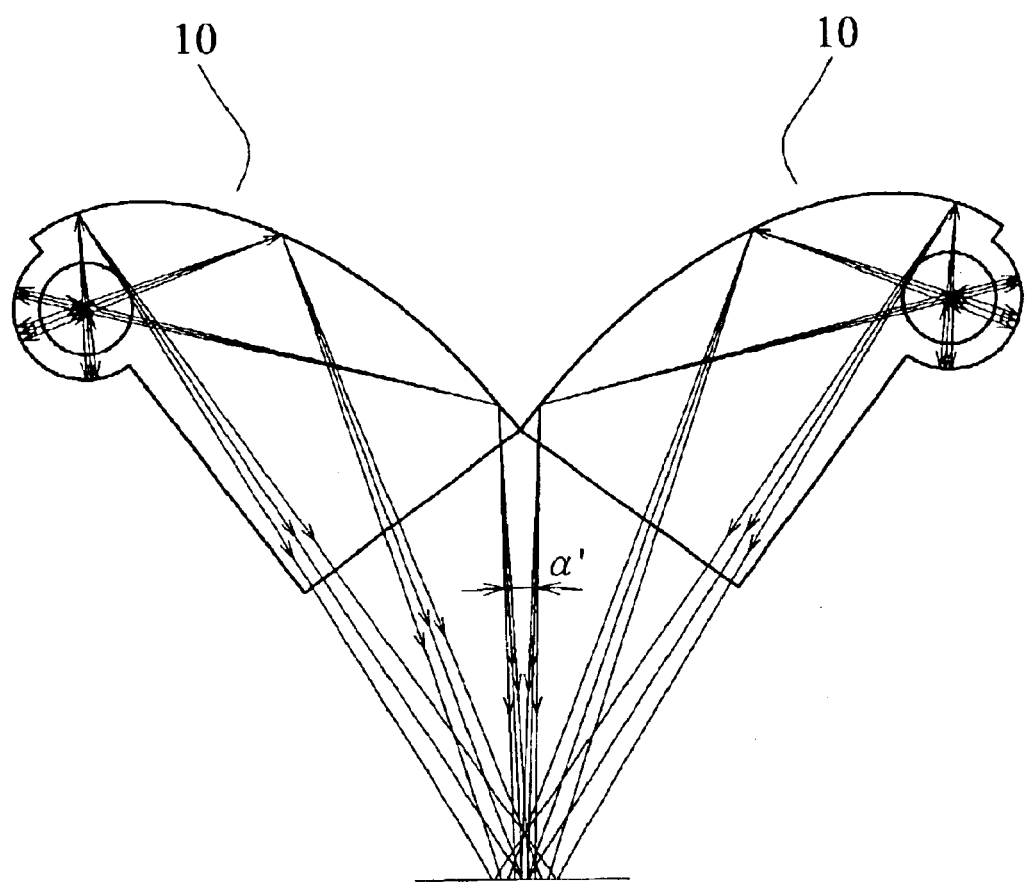
FIG. 5 is a partially cross sectional view of a structure for collecting light according to one modification of the third embodiment of the present invention.

Consequently, it should be understood for one of ordinary skill in the art according to the above-mentioned descriptions that one modification of the third embodiment of the present invention would be obtained by arranging two structures 10 in the manner as shown in FIG. 5, so that the angle a $\alpha'$ can be designed to be sufficiently small.

Further, it should be understood for one of ordinary skill in the art according to the above-mentioned descriptions that another modification of the third embodiment would be obtained by substituting the semi-paraboloid for the semi-ellipsoid. In this case, when the lens is preferably provided in the direction of advancement of the reflected light, it is possible to not only allow both of the light emitted from two light sources to be condensed on a predetermined location, but also achieve an effect on improved uniformity in brightness due to the desirably reduced spot size.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A structure for reflection of light comprising:

a light source, a curved surface reflector for reflecting the light emitted from a light source located on a first focus of the curved surface reflector; and a semi-sphere surface reflector for reflecting the light emitted from the light source located on a center of the semi-sphere surface;

wherein the first focus of the curved surface reflector and the center of the semi-sphere surface are so positioned as to be substantially on the same location, thus after the light emitted from the light source is reflected by the semi-sphere surface, the reflected light passes through the center of the semi-sphere surface to illuminate on the curved surface reflector, so that all of the light reflected by the semi-sphere surface can pass through the center to illuminate on the curved surface reflector and is then reflected by the same.

2. The structure as recited in claim 1, wherein the curved surface reflector is a semi-ellipsoid, so that the light reflected by the structure is condensed at a second focus of the semi-ellipsoid.

3. The structure as recited in claim 1, wherein the curved surface reflector is a semi-paraboloid.

4. The structure as recited in claim 3 further comprising a lens for condensing the light reflected by the structure at a second focus.

5. A structure for collecting light comprising:

a first light source, a second light source, a first curved surface reflector for reflecting the light emitted from the first light source located on a first focus of the first curved surface reflector;

a second curved surface reflector for reflecting the light emitted from the second light source located on a first focus of the second curved surface reflector;

a first semi-sphere surface for reflecting the light emitted from the first light source located on a center of the first semi-sphere surface; and a second semi-sphere surface for reflecting the light emitted from the second light source located on a center of the second semi-sphere surface;

wherein the first focus of the first curved surface reflector and the center of the first semi-sphere surfaces are so positioned as to be substantially on a first location, and the first focus of the second curved surface reflector and the center of the second semi-sphere surfaces are so positioned as to be substantially on a second location, and wherein after the light emitted from the first and second light sources is reflected by the first and second semi-sphere surfaces, respectively, the reflected light pass through the respective centers to illuminate on the first and second curved surface reflectors, respectively, so that all of the light reflected by the first and second semi-sphere surfaces can pass through the respective centers to illuminate on the respective curved surface reflector, be reflected by the same, then be condensed on a second focus.

6. The structure as recited in claim 5, wherein a combination of the first curved surface reflector and the first semi-sphere surface reflector and another combination of the second curved surface reflector and the second semi-sphere surface reflector are arranged in an angular manner.

7. The structure as recited in claim 6, wherein each of the first and second curved surfaces reflector is a semi-ellipsoid, so that the reflected light is condensed at a second focus of the semi-ellipsoid.

8. The structure as recited in claim 6, wherein each of the first and second curved surface reflector is a semi-paraboloid.

9. The structure as recited in claim 8 further comprising at least one lens for condensing the reflected light at a second focus.

* * * * *